US012655328B2

(12) United States Patent
Ogden et al.

(10) Patent No.: US 12,655,328 B2
(45) Date of Patent: Jun. 16, 2026

(54) MODIFIED GUAYULE RESIN/SOY PROTEIN BLENDS FOR BIO-BASED ADHESIVES, ASSOCIATED METHODS FOR FORMING SAME, AND ASSOCIATED STRUCTURES INCLUDING SUCH ADHESIVES

(71) Applicant: Arizona Board of Regents on Behalf of the University of Arizona, Tucson, AZ (US)

(72) Inventors: Kimberly Ogden, Tucson, AZ (US); Sarocha Pradyawong, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 323 days.

(21) Appl. No.: 18/031,716

(22) PCT Filed: Oct. 13, 2021

(86) PCT No.: PCT/US2021/054719
§ 371 (c)(1),
(2) Date: Apr. 13, 2023

(87) PCT Pub. No.: WO2022/081666
PCT Pub. Date: Apr. 21, 2022

(65) Prior Publication Data
US 2023/0392054 A1      Dec. 7, 2023

Related U.S. Application Data

(60) Provisional application No. 63/092,889, filed on Oct. 16, 2020.

(51) Int. Cl.
*C09J 7/00*          (2018.01)
*B32B 7/12*          (2006.01)
(Continued)

(52) U.S. Cl.
CPC .............. *C09J 107/00* (2013.01); *B32B 7/12* (2013.01); *B32B 21/13* (2013.01); *B32B 21/14* (2013.01);
(Continued)

(58) Field of Classification Search
None
See application file for complete search history.

(56) References Cited

U.S. PATENT DOCUMENTS 2,410,780 A      11/1946  Gracia
4,435,337 A  *   3/1984  Kay .......................... C08J 11/06
554/23
(Continued)

FOREIGN PATENT DOCUMENTS

CN          105838304 B      10/2018
FR            2844998 A1  *  4/2004  ............... A61K 8/31

OTHER PUBLICATIONS

Machine translation of FR-2,844,998-A1 (Year: 2004).*
(Continued)

*Primary Examiner* — Ramsey Zacharia
(74) *Attorney, Agent, or Firm* — Howard & Howard Attorneys PLLC

(57) ABSTRACT

An adhesive composition for use in coupling together two substrates to form a structure, such as for use in coupling together two wooden substrates to form a wooden structure, includes a mixture of a modified guayule resin and soy protein. The modified guayule resin can be a base-solvent modified guayule resin or can be an HiCh-modified guayule resin each respectively formed from an unmodified guayule base resin. The unmodified guayule base resin is obtained in a rubber extraction process of guayule at solvent removal temperatures ranging from 104 to 166 degrees Celsius. The method for forming the adhesive composition includes
(Continued)

10          20          30          40 forming a modified guayule resin and mixing the formed modified guayule resin with soy protein. The adhesive composition, when used in forming structures, provides enhanced wet shear strength as compared with adhesive compositions including soy protein alone.

12 Claims, 10 Drawing Sheets

(51) Int. Cl.

| | |
|---|---|
| *B32B 21/13* | (2006.01) |
| *B32B 21/14* | (2006.01) |
| *C09F 1/04* | (2006.01) |
| *C09J 107/00* | (2006.01) |

(52) U.S. Cl.
CPC ............ *C09F 1/04* (2013.01); *B32B 2250/02* (2013.01); *B32B 2255/08* (2013.01); *B32B 2255/26* (2013.01); *B32B 2307/54* (2013.01); *B32B 2307/542* (2013.01); *B32B 2307/748* (2013.01)

(56) References Cited

U.S. PATENT DOCUMENTS

| | | | |
|---|---|---|---|
| 4,542,191 | A | 9/1985 | Kay et al. |
| 4,621,118 | A | 11/1986 | Schloman, Jr. et al. |
| 6,231,985 | B1 | 5/2001 | Chen et al. |
| 6,518,387 | B2 | 2/2003 | Kuo et al. |
| 7,790,036 | B2 * | 9/2010 | Cornish ............. B01D 11/0203 |
| | | | 210/639 |
| 9,969,818 | B2 | 5/2018 | Battistel et al. |
| 2002/0006987 | A1 | 1/2002 | Nakayama et al. |
| 2008/0260899 | A1 | 10/2008 | Schmidt et al. |
| 2014/0288255 | A1 | 9/2014 | Martin et al. |
| 2014/0329102 | A1 | 11/2014 | Randall et al. |
| 2017/0081484 | A1 * | 3/2017 | Jagannathan ............. C08J 3/26 |
| 2018/0282595 | A1 * | 10/2018 | Cruz ..................... A61K 8/731 |
| 2019/0127495 | A1 | 5/2019 | Sauty et al. |

OTHER PUBLICATIONS

Boateng, Akwasi et al., "Energy-Dense Liquid Fuel Intermediates by Pyrolysis of Guayule (*Parthenium argentatum*) Shrub and Bagasse", Fuel, vol. 88, 2009, pp. 2207-2215.

Bultman, John D. et al., "The Efficacy of Guayule Resin as a Pesticide", Bioresource Technology, vol. 35, 1991, pp. 197-201.

Cantu, D. Jasso et al., "Seasonal Growth, Rubber and Resin Yield Characteristics of Guayule Under Natural Environmental Conditions", Industrial Crops and Products, vol. 6, 1997, pp. 131-137.

Estilai, Ali, "Biomass, Rubber, and Resin Yield Potentials of New Guayule Germplasm", Bioresource Technology, vol. 35, 1991, pp. 119-125.

Foster, M.A. et al., "Guayule Agronomics: Establishment, Irrigated Production, and Weed Control", Industrial Crops and Products, vol. 22, 2005, pp. 27-40.

International Search Report for Application No. PCT/US2021/054719 dated Feb. 14, 2022, 1 page.

Kuester, James L., "Conversion of Guayule Residues into Fuel Energy Products", Bioresource Technology, vol. 35, 1991, pp. 217-222.

Mo, Xiaoqun et al., "Themal Properties and Adhesion Strength of Modified Soybean Storage Proteins", JAOCS, vol. 18, No. 4, 2004, pp. 395-400.

Nakayama, F.S., "Guayule Future Development", Industrial Crops and Products, vol. 22, 2005, pp. 3-13.

Pradyawong, Sarocha et al., "Adhesion Properties of Soy Protein Adhesives Enhanced by Biomass Lignin", International Journal of Adhesion and Adhesives, vol. 75, 2017, pp. 66-73.

Pradyawong, Sarocha et al., "Laccase/TEMPO-modified Lignin Improved Soy-Protein-Based Adhesives: Adhesion Performance and Properies", International Journal of Adhesion and Adhesives, , vol. 91, 2019, pp. 116-122.

Rasutis, Daina et al., "A Sustainability Review of Domestic Rubber from the Guayule Plant", Industrial Crops and Products, vol. 70, 2015, pp. 383-394.

Ray, Dennis T et al., "Breeding Guayule for Commercial Production", Industrial Crops and Products, vol. 22, 2005, pp. 15-25.

Ren, "Improving Sustainability of Rubber Composites with Renewable Additives and Epoxidized Guayule Natural Rubber" Dissertation, Ohio State University, http://rave.ohiolink.edu/etdc/view?acc_num=osu1574440536318129, 2019, pp. 5-12 and 175-196.

Schloman, Jr., W.W. et al., "Handbook of Elastomers - Chapter 1: Guayule Rubber", Marcel Dekker, Inc., 2nd Edition, 2000-2001, 29 pages.

Schloman, Jr., W.W., "Processing Guayule for Latex and Bulk Rubber", Industrial Crops and Products, vol. 22, 2005, pp. 41-47.

Schloman, Jr., William W. et al., "Guayule Byproduct Evaluation: Extract Characterization", American Chemical Society, 1983, pp. 873-876.

Silva et al., Modified Guayule Resins and Resin/Soy Protein Blends for Adhesives, AUTM, https://aim.autm.net/public/project/60040, Apr. 1, 2021, 1 page.

Wagner, J.P. et al., "Establishing a Domestic Guayule Natural Rubber Industry", Polymer-Plastics Technology and Engineering, vol. 28, Nos. 7-8, 1989, pp. 753-777.

Lhamo, Dhondup et al., "Effect of Protein Addition on Properties of Guayule Natural Rubber", Rubber Chemistry and Technology, vol. 90, No. 1, Jun. 1, 2017, pp. 387-404.

English language abstract and machine-assisted English translation for CN 105838304 B extracted from espacenet. com database on Sep. 25, 2024, 12 pages.

* cited by examiner 10    20    30    40

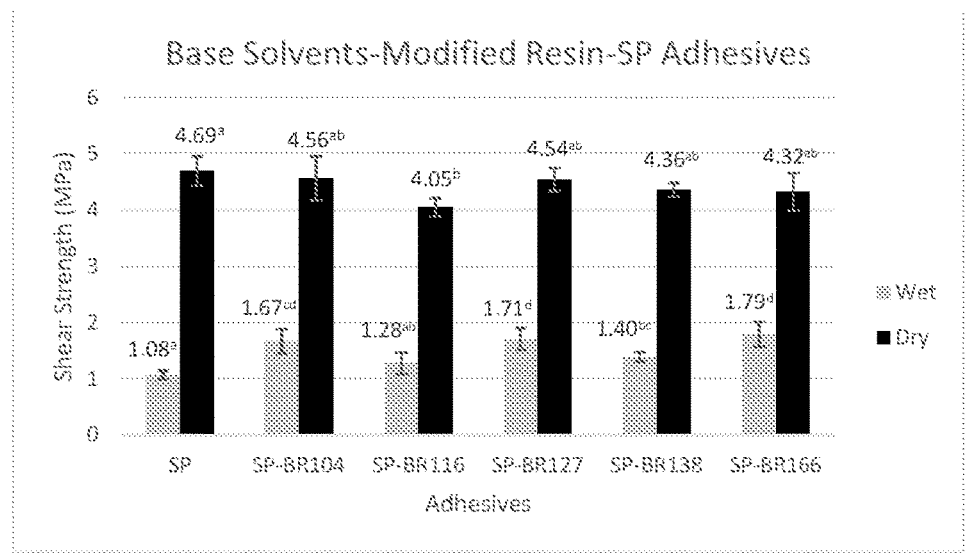
FIG. 2 - Wet and dry shear strength of base-solvent modified guayule resin-SP adhesives and comparative SP adhesive. Means followed by different letters are significantly different at $p < 0.05$.

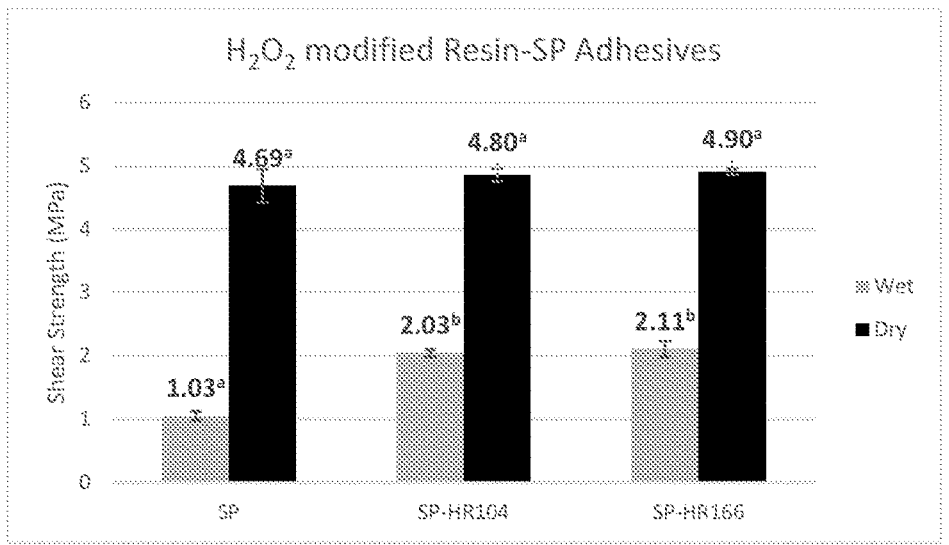
FIG. 3 - Wet and dry shear strength of $H_2O_2$-modified guayule resin-SP adhesives and comparative SP adhesive. Means followed by different letters are significantly different at $p < 0.05$.

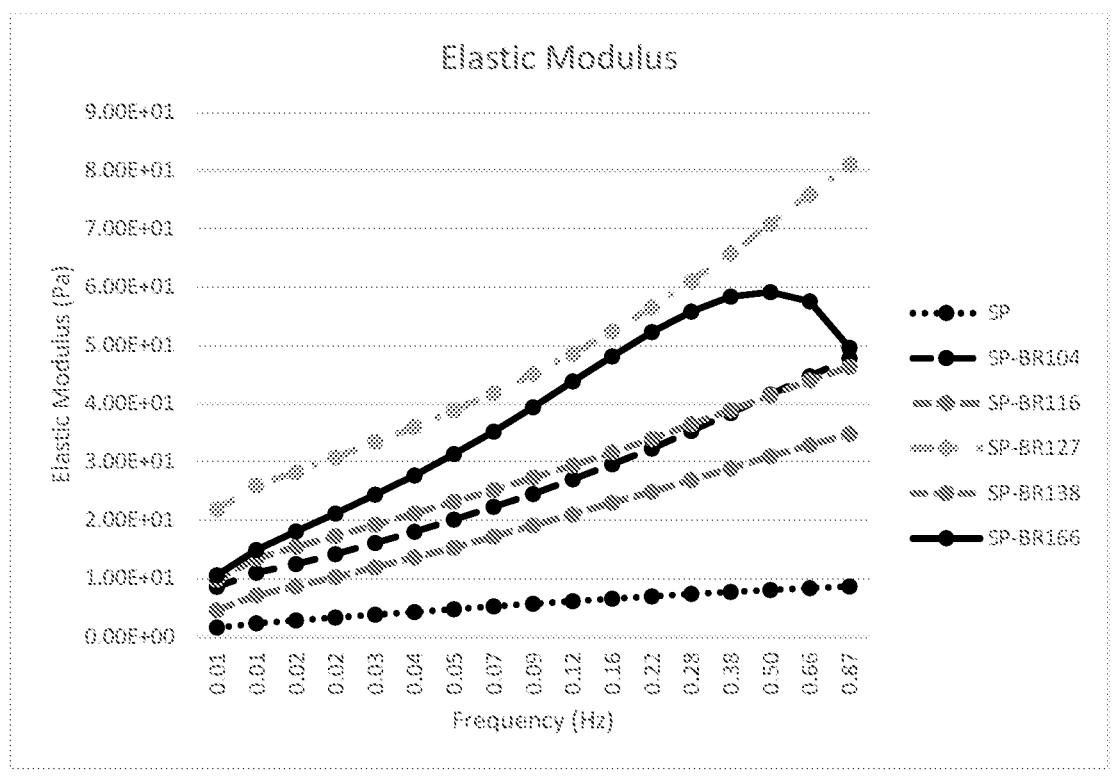
FIG. 4 - Elastic modulus of SP and SP-resin adhesives
at the temperature range of 104 to 166 °C

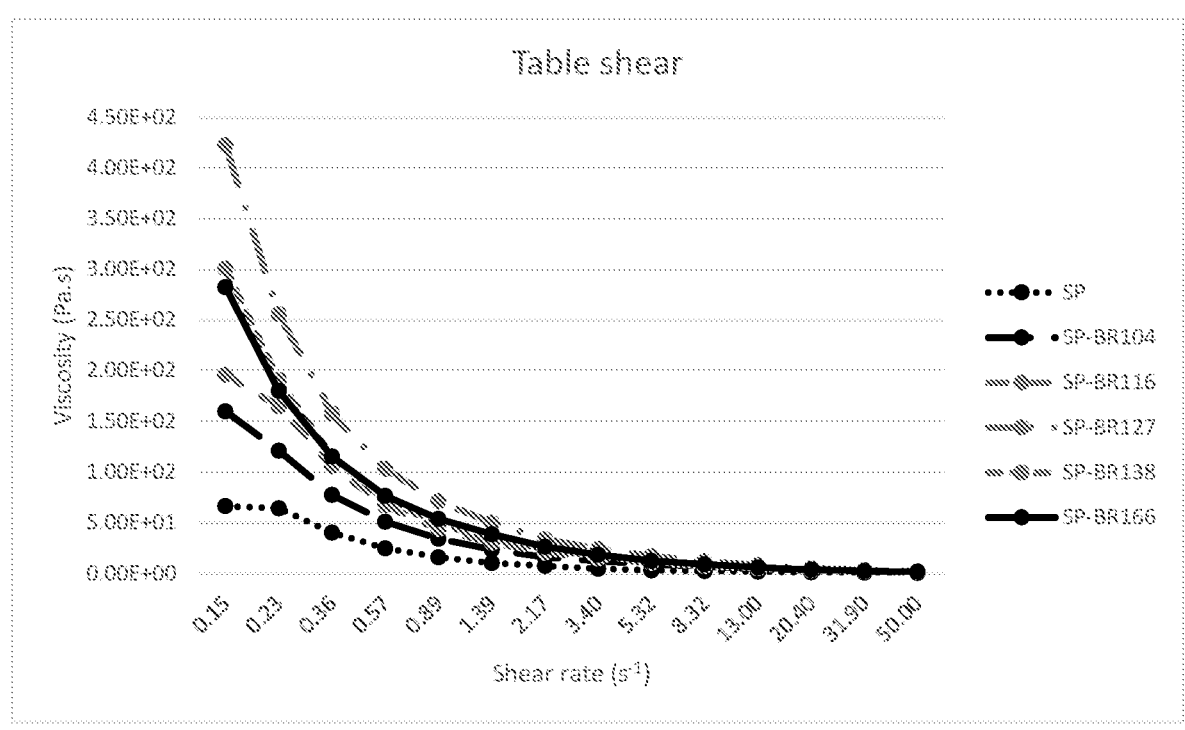
FIG. 5 – Viscosity profiles of SP and resin-SP adhesives
at different shear rates (Table Shear)

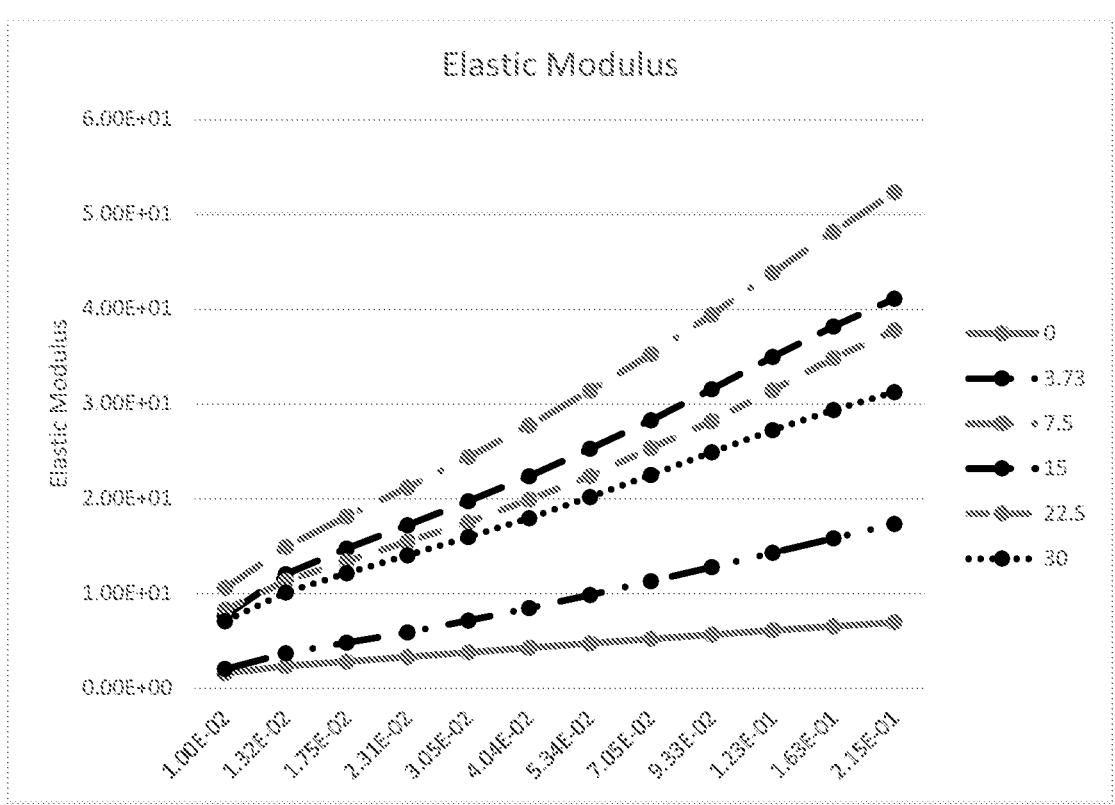
FIG. 6 -  Elastic modulus of resin-soy protein adhesives.

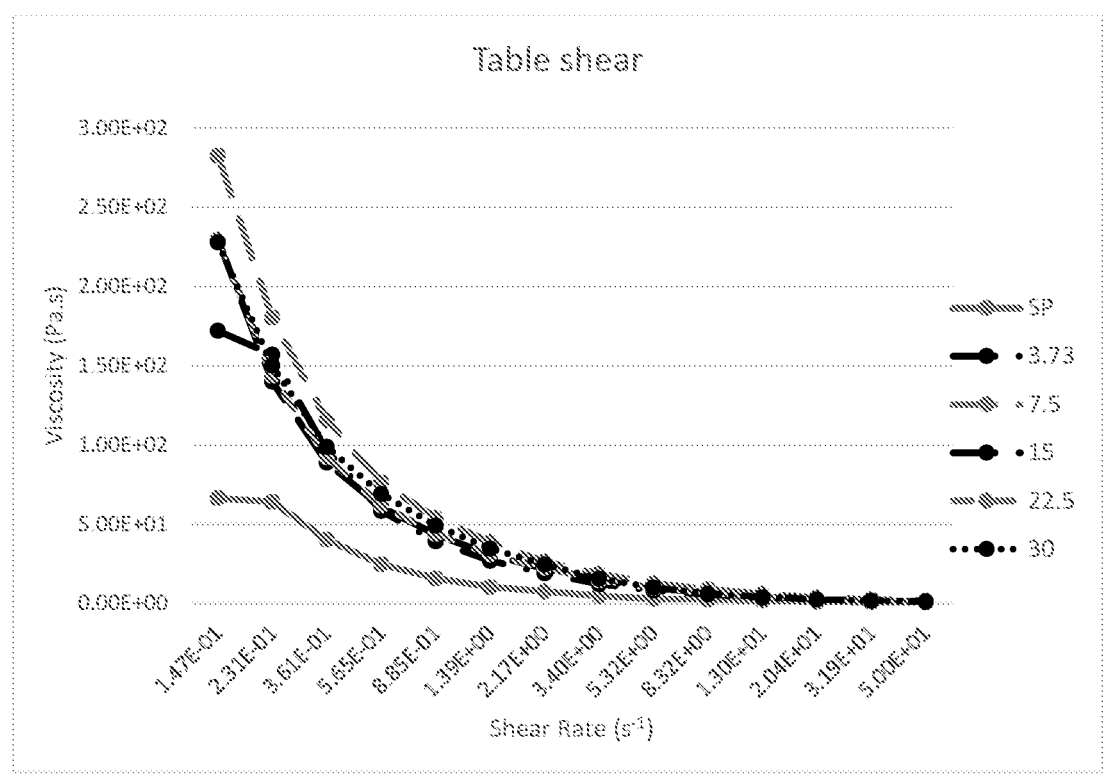
FIG. 7 - Viscosity profiles of resin-soy protein adhesives at different shear rates (Table Shear).

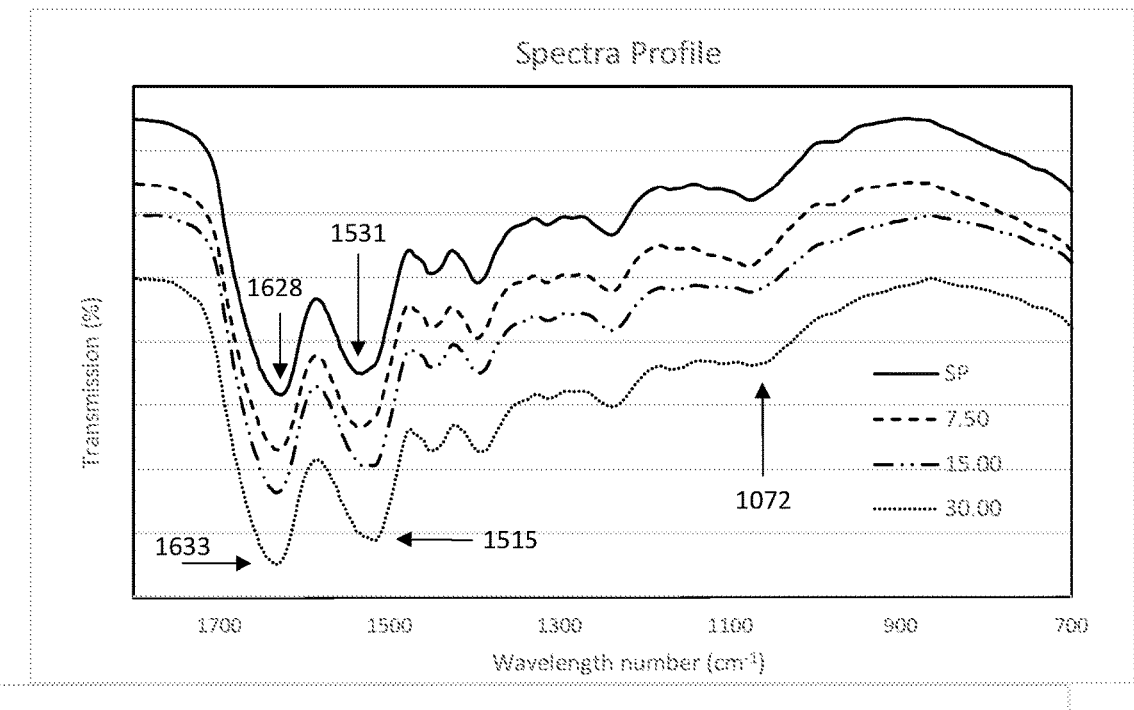
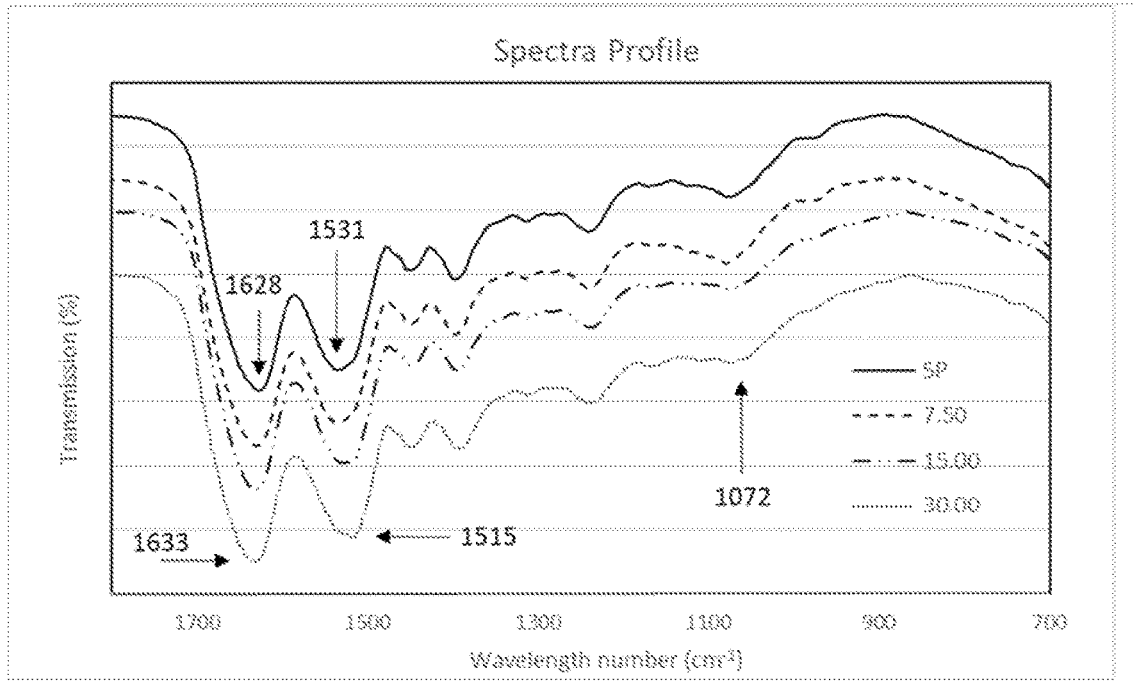
FIG. 8 - FTIR spectra profile of SP and SP-modified guayule resin adhesives

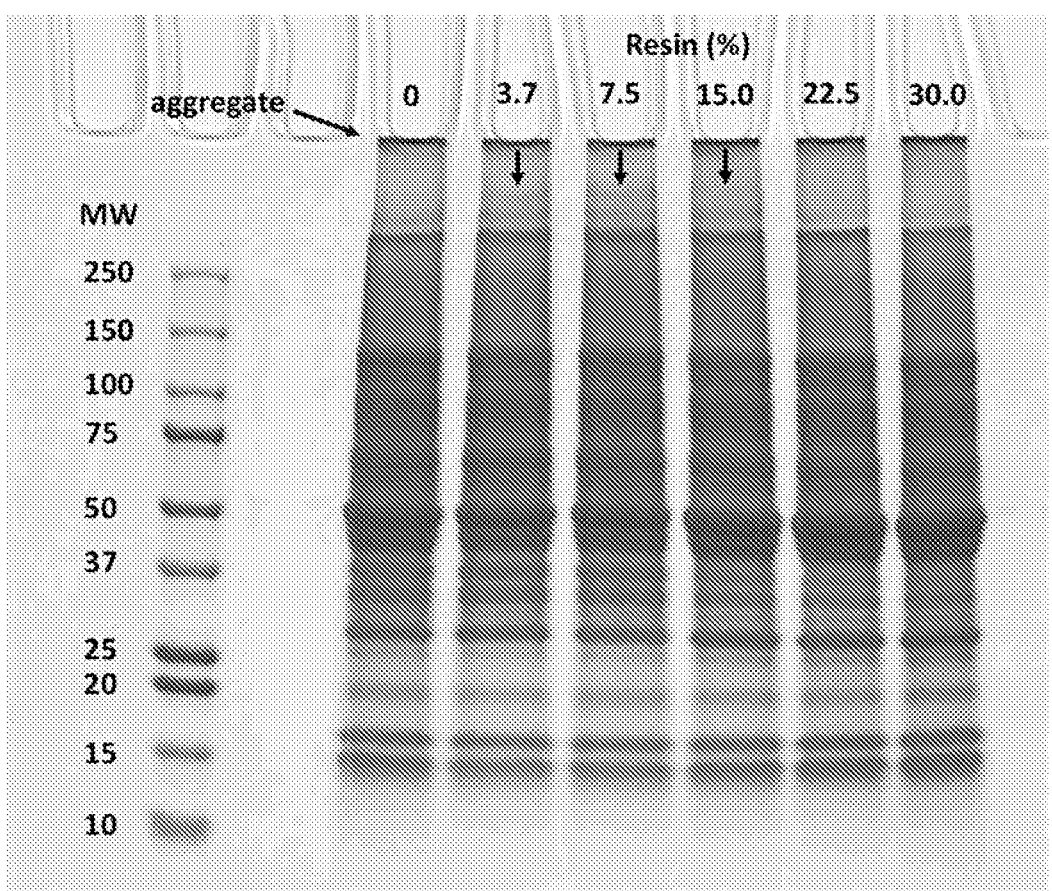
FIG. 9 - SDS-PAGE of SP and SP-modified guayule resin adhesives

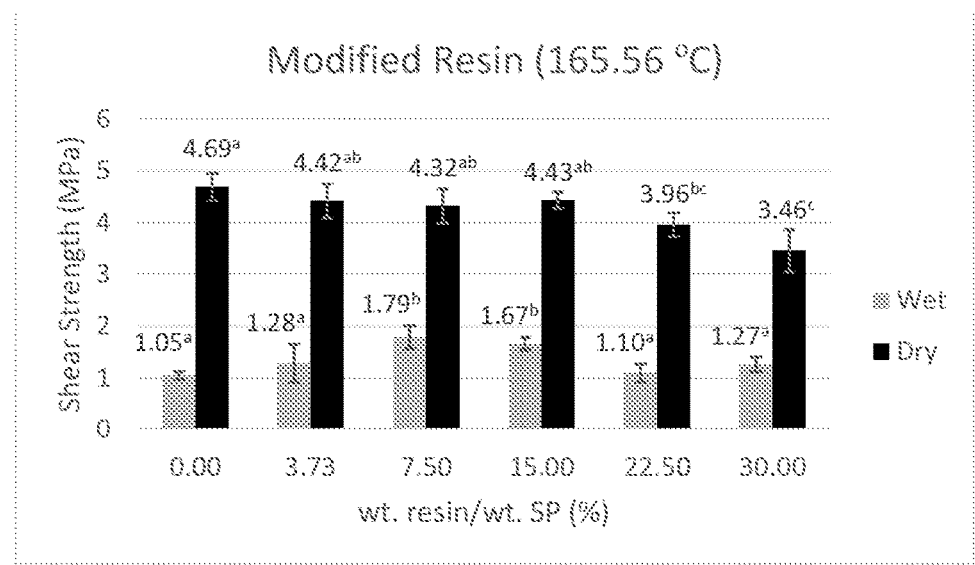
Fig. 10 - Wet and dry shear strength of resin-soy protein adhesives at
165.56 Degrees Celsius. Means followed by different letters are
significantly different at p < 0.05.

MODIFIED GUAYULE RESIN/SOY PROTEIN BLENDS FOR BIO-BASED ADHESIVES, ASSOCIATED METHODS FOR FORMING SAME, AND ASSOCIATED STRUCTURES INCLUDING SUCH ADHESIVES

RELATED APPLICATIONS

This application is the National Stage of International Patent Application No. PCT/US2021/054719, filed on Oct. 13, 2021, which claims priority to and the benefit of U.S. Provisional Patent Application No. 63/092,889, filed on Oct. 16, 2020, the entire contents of which are hereby incorporated by reference.

GOVERNMENT SUPPORT

This invention was made with government support under Grant No. 2017-68005-26867, awarded by USDA/NIFA. The government has certain rights in the invention.

1. FIELD OF THE INVENTION

The present invention relates generally to modified guayule resins, associated bio-based adhesives including the modified guayule resins, and more particular to modified guayule resin/soy protein blends for bio-based adhesives, and associated methods for forming same.

2. DESCRIPTION OF THE RELATED ART

Guayule has the potential to replace both synthetic and natural rubber in a wide variety of potential applications and products. The use of guayule could help the United States decrease its reliance on non-renewable petroleum sources and imported natural rubber (Rasutis et al., 2015). Guayule has drawn a commercial interest due to the success of guayule rubber yield enhancement from breed improvement and growing techniques (Foster et al., 2005; Ray et al., 2005). Additionally, guayule is a low input crop with a stable price regarding a consistent domestic supply (Rasutis et al., 2015; Rodriguez-Garcia et al., 1998).

Guayule rubber is extracted by the simultaneous extraction method which includes solvent extraction and solvent removal processes (Schloman Jr and Products, 2005; Schloman Jr and McIntyre, 2000). The major by-products of this rubber extraction process are guayule bagasse and resin. Utilization of the by-products will help the overall economic sustainability of guayule (Estilai, 1991; Rasutis et al., 2015; Wagner et al., 1989). Guayule resin can be applied to a wide range of applications, such as pesticides, fuel, cosmetics, pharmaceuticals, paint, wood preservation as well as adhesives (Boateng et al., 2009; Bultman et al., 1991; Kuester, 1991; Nakayama and Products, 2005).

Soy Protein (SP) can also be utilized in a bio-based adhesives and has shown a high potential to replace form-aldehyde-based adhesives in wood-based industries. Improvement of water resistance would help to explore the market share of SP-based adhesives (Grand View Research, 2017; Mo et al., 2004; Pradyawong et al., 2017).

The present invention provides a bio-based adhesives having enhanced properties as compared with standard SP-based adhesives by utilizing a combination of a modified guayule resin and soy protein.

SUMMARY OF THE INVENTION AND ADVANTAGES

An adhesive composition for use in coupling together two substrates to form a structure, such as for use in coupling together two wooden substrates to form a wooden structure, includes a mixture of a modified guayule resin and soy protein and optionally an unmodified guayule resin. The modified guayule resin can be a base-solvent modified guayule resin or can be an $H_2O_2$-modified guayule resin each respectively formed from the unmodified guayule resin. The unmodified guayule resin may be obtained in a rubber extraction process of guayule at solvent removal temperatures ranging from 104 to 166 degrees Celsius.

The method for forming the adhesive composition includes providing, or otherwise forming, a modified guayule resin obtained from a guayule base resin and mixing the modified guayule resin with soy protein and optionally with an unmodified guayule resin. The formed adhesive can then be used to couple together a pair of substrates to form a structure, with the adhesive composition including the modified guayule resin and soy protein providing enhanced wet shear strength, and hence improved water resistance, for the structure as compared with the wet shear strength for the structure utilizing an adhesive composition including soy protein alone.

BRIEF DESCRIPTION OF THE DRAWINGS

Other advantages of the present invention will be readily appreciated, as the same becomes better understood by reference to the following detailed description when considered in connection with the accompanying drawings.

FIG. 2 is a graph plotting the mean values of wet shear strengths and dry shear strengths of various modified guayule resin/soy protein adhesives in accordance with one exemplary embodiment compared to an adhesive formed from soy protein alone.

FIG. 3 is a graph plotting the mean values of wet shear strengths and dry shear strengths of various modified guayule resin/soy protein adhesives in accordance with another exemplary embodiment compared to an adhesive formed from soy protein alone.

FIG. 4 is a graph comparing the elastic modulus of the SP and SP-modified guayule resin adhesives at the temperature range of 104 to 166° C.

FIG. 5 is graph comparing the viscosity of the SP and SP-modified guayule resin adhesives at the temperature range of 104 to 166° C. at various shear rates.

FIG. 6 is a graph illustrating the elastic modulus of resin-soy protein adhesives in accordance with an exemplary embodiment.

FIG. 7 is a graph illustrating the viscosity of resin-soy protein adhesives at different shear rates in accordance with an exemplary embodiment.

FIG. 8 is graph comparing the FTIR spectra profile of SP and SP-modified guayule resin adhesives in accordance with an exemplary embodiment.

FIG. 9 is an SDS-PAGE profile of SP and SP-modified guayule resin samples in accordance with an exemplary embodiment.

FIG. 10 is a graph illustrating the mean values of wet and dry shear strength of resin-soy protein adhesives in accordance with an exemplary embodiment.

DETAILED DESCRIPTION OF THE INVENTION

Figure 1:
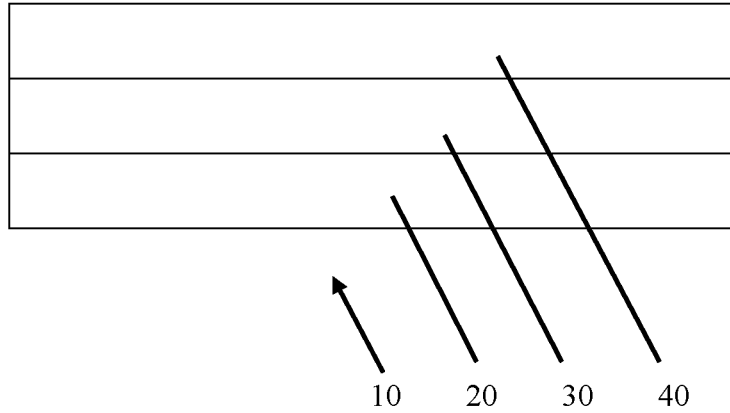
FIG. 1 is a side view of a structure having an adhesive in accordance with the present invention disposed between a pair of substrates.

The present invention is directed to adhesive compositions that used in coupling together two substrates to form a structure. In particular, the adhesive compositions of the present invention may be in the form of a wood adhesive composition and can be used for coupling together two wooden substrates to form a wooden structure.

The adhesive composition of the exemplary embodiments includes a mixture of a modified guayule resin and soy protein and optionally includes an unmodified guayule base resin. The modified guayule resin can be in the form of a base-solvent modified guayule resin, formed via a base-solvent process, or in the form of an $H_2O_2$-modified guayule resin, formed via a $H_2O_2$ modification process, each process further described below.

In certain embodiments, the soy protein is included in the adhesive composition in an amount ranging from 5% to 40% by weight of the total weight of the adhesive composition, such as from 8% to 12% by weight of the total weight of the adhesive composition, such as 10% by weight of the total weight of the adhesive composition.

In certain embodiments, the modified guayule resin is included in the adhesive composition in an amount ranging from 0.1% to 25% by weight of the total weight of the adhesive composition, such as from 0.5% to 10% by weight of the total weight of the adhesive composition, such as 0.75% by weight of the total weight of the adhesive composition. Still further, in certain embodiments, the modified guayule resin is included in the adhesive composition in an amount ranging 0.1% to 50% by weight of the total weight of the soy protein, such as from 0.1% to 30%, such as 7.5% by weight of the total weight of the soy protein.

In still further embodiments, the soy protein is included in the adhesive composition in an amount ranging 5% to 40% by weight of the total weight of the adhesive composition such as from 8% to 12% by weight of the total weight of the adhesive composition, such as 10% by weight of the total weight of the adhesive composition, and the modified guayule resin is included in the adhesive composition ranging from 0.1% to 25% of the total weight of the adhesive composition, such as from 0.5% to 10% of the total weight of the adhesive composition, such as 0.75% of the total weight of the adhesive composition. Still further, in these still further embodiments, the modified guayule resin is included in the adhesive composition in an amount ranging 0.1% to 50% by weight of the total weight of the soy protein, such as from 0.1% to 30%, such as 7.5% by weight of the total weight of the soy protein.

In yet still further embodiments, wherein the unmodified guayule resin is included in the adhesive composition in addition to the modified guayule resin, the total amount of the modified guayule resin and unmodified guayule included in the adhesive composition ranges from 0.1% to 25% of the total weight of the adhesive composition, such as from 5 to 10% of the total weight of the adhesive composition, such as 0.75% of the total weight of the adhesive composition. In these embodiments, the weight ratio of modified guayule resin to unmodified guayule is not limited and may be between 100:0 to 0:100, such as from 99.9:0.1 to 0.1:99.9. Preferably, however, the total weight of the modified guayule resin is greater than or equal to the total weight of the unmodified guayule resin in the adhesive composition, and even more preferably is significantly greater than the total weight of the unmodified guayule resin, such as by two times or more greater than the total weight of the unmodified guayule resin. Accordingly, in certain embodiments, the weight ratio of modified guayule resin to unmodified guayule resin is from 100:0 to 50:50, such as from 99.9:0.1 to 50.1:49.9, such as from 99.9:0.1 to 66.6:33.3, such as from 99.9:0.1 to 75:25. Even still further, in these yet still further embodiments, the modified guayule resin is included in the adhesive composition in an amount ranging 0.1% to 50% by weight of the total weight of the soy protein, such as from 0.1% to 30%, such as 7.5% by weight of the total weight of the soy protein.

The modified guayule resin in accordance with the exemplary embodiments is formed from a guayule base resin, also alternatively referred to herein as an unmodified guayule resin or the unmodified guayule base resin as referenced above. The guayule base resin may be provided from any commercial source or may be obtained as one of the major by-products when guayule rubber is extracted from a guayule plant by the simultaneous extraction method which includes solvent extraction and a solvent removal processes.

In certain embodiments, the guayule base resin is obtained as a by-product from a guayule rubber extraction process operating at various solvent removal temperatures in the range of 104 to 166 degrees Celsius (° C.) by the known processes such as the processes described above (see Schloman Jr and Products, 2005; Schloman Jr and McIntyre, 2000). In certain embodiments, such as in the examples provided below, the guayule base resin is obtained as a by-product from guayule rubber extraction via such known solvent extraction processes operating at solvent removal temperatures of 104.44° C., 115.56° C., 126.67° C., 137.78° C., and 165.56° C., respectively.

The soy protein, in certain embodiments, may be commercially provided, such as in the form of a powder, or may be obtained from defatted soy flour as a powder. In certain embodiments, a defatted soy flour is dissolved in water to form a soy protein solution, with the pH of the soy protein solution being adjusted to between 8.0 and 9.0, such as 8.5, using a base such as NaOH and to solubilize the soy protein (SP) in the soy protein solution. The solution is then centrifuged, with the supernatant solution containing the soy protein and water separated from the precipitants such as fiber. The supernatant solution is then adjusted to a pH of between 4.2 and 4.5, such as about 4.2, with an acid such as hydrochloric acid for a period of about two hours to precipitate the soy protein from the supernatant, at which time an additional centrifuging step is performed. The supernatant is then removed and discarded, and the remaining precipitated soy protein is resolubilized with water and neutralized to a neutral pH, such as to a pH of 7.0. The resultant soy protein solution, in the form of a slurry, is freeze-dried and ground to form a soy protein powder.

Alternatively, the soy protein may be utilized in the form of a soy protein slurry, with the slurry being formed by slowly adding soy protein to water to form a phase-modified soy protein which is adjusted to a neutral pH between 6.0 and 8.0, typically a pH of 7.0.

As provided herein, and including in the Examples below, the description of a pH of any number approximates that number within a range of +/−0.5 of the number provided. Accordingly, the description of the pH of 7.0 above includes pH's ranging from 6.5 to 7.5 as described herein, whereas the description of the pH of 8.5 includes pH's ranging from 8.0 to 9.0 and the description of the pH of 4.2 includes pH's ranging from 3.7 to 4.7.

As noted above, the modified guayule resin may be in the form of a base-solvent modified guayule resin. To form the base-solvent modified guayule resin via the base-solvent process, in accordance with one exemplary embodiment, the guayule base resin as described above is mixed with a solvent mixture to form a resin mixture. In certain embodiments, the solvent mixture includes hexane, acetone, and water mixed at a ratio of 5:5:3 by volume. A base, such as NaOH, is then added to the resin mixture and mixed. During this mixing, the base and guayule base resin react, such as via a saponification process, to form the base-solvent modified-guayule resin, here a base-solvent modified guayule resin, contained within the solvent mixture.

As noted above, the modified guayule resin may be in the form of a $H_2O_2$-modified guayule resin. To form the $H_2O_2$-modified guayule resin via the $H_2O_2$ modification process in accordance with another exemplary embodiment, the guayule base resin as described above is first dissolved in a solvent such as acetone to form a solution mixture. A 50% by volume mixture of $H_2O_2$ in water is then added to the solution mixture and mixed for a predetermined time period sufficient to react with $H_2O_2$ with the guayule base resin, such as through oxidation, to form the $H_2O_2$-modified guayule resin.

As provided herein, and including in the Examples below, the description of any mixtures by volume approximates the numbers of the mixture components provided in the range of +/−10%. Accordingly, a solvent mixture includes hexane, acetone, and water mixed at a ratio of 5:5:3 by volume may have slightly varying amounts of the respective volumes of hexane, acetone, and water within 10 volume % of the values provided, while a 50% by volume mixture of $H_2O_2$ in water may have up to 10% more or less volume $H_2O_2$ relative to the volume of water. Similarly, and including in the Examples below, the description of any mixtures by weight approximates the numbers of the mixture components provided in the range of +/−10%.

Finally, to form the adhesive composition, the modified guayule resin (i.e., either the base-solvent modified guayule resin or the $H_2O_2$-modified guayule resin, or both, as described above) alone or in combination with the unmodified guayule resin, is mixed with the soy protein. A solvent, preferably water, may then added to the resultant mixture to form that adhesive having the relative weight ratios of soy protein and modified guayule resin as described above.

In certain embodiments, the adhesive is formed by mixing the modified guayule resin with a soy protein slurry. A solvent, preferably water, may then added to the resultant mixture to form that adhesive having the relative weight ratios of soy protein and modified guayule resin as described above.

The resultant adhesive may then be used for coupling together two substrates to form a structure, such as for use in coupling together two wooden substrates to form a wooden structure.

Referring to FIG. 1, a structure 10 in accordance with the present invention is provided and includes the adhesive 30 in accordance with the exemplary embodiments as described above couple or otherwise disposed between and adhering together a pair of substrates 20, 40. In certain embodiments, the substrates 20, 40 are in the form of wooden substrates such as wooden planks or beams, and thus the resultant structure 10 may be referred to as a wooden structure 10.

In FIG. 1, the adhesive 30 may be applied to either one, or both, of the substrates 20, 40. The substrates 20, 40 are then positioned such that the adhesive 30 is located between the substrates 20, 40. The substrates 20, 40 are then pressed together, with the adhesive 30 disposed and contacting each of the substrates 20, 40 to adhere the first substrate 20 to the second substrate 40 to complete the structure 10.

As will be confirmed in the examples below, structures 10 including the adhesives 30 formed in accordance with the exemplary embodiments of the present invention have enhanced wet shear strength under the ASTM standard method (ASTM D1183-03) (ASTM, 2003) as compared with the wet shear strength for corresponding structures including the same substrates 20, 40 and utilizing an adhesive composition including soy protein alone but otherwise formed by the same methodology and with the adhesives applied to the substrates 20, 40 in the same manner. Enhanced wet shear strength, as provided herein, is correlated to improved water resistance for the adhesive portion of a structure 10 in which the adhesive is applied between two substrate 20, 40 for coupling the substrates 20, 40 together via adhesion.

The use of modified guayule resins in adhesive compositions, in combination with soy protein as described above, provides a bio-based alternative as compared with other similar adhesives utilizing synthetic and natural rubber or other non-renewable petroleum sources. Further, the inclusion of modified guayule resins in the adhesive compositions accordance with the exemplary embodiments provided herein, in combination with soy protein, form new bio-based adhesives having enhanced wet strength properties as compared with standard soy protein adhesives formed without such modified guayule resins when used for adhering together substrates to form a structure.

EXAMPLES

Statistical Analysis

The contact angle denaturing temperatures, enthalpy, and shear strength data presented as mean values in FIGS. 2, 3 and 10 as discussed below were analyzed through analysis of variance by statistical software (SAS Institute, Inc., Cary, North Carolina). Pairwise comparisons using the Tukey adjustment were conducted at a significance level of 0.05. The data was then grouped into categories by letter (a, b, c, d, or e). The data in the same group (i.e., group a, b, c, d, or e) are not significantly different from other data within the same group. On the other hand, the data that were categorized by the SAS program into different groups are statistically different. This defines therefore the meaning of the sentence "Means followed by different letters are significantly different at p<0.05" as provided in FIGS. 2, 3 and 10.

In particular, the data in Group a are significantly lower than the other Groups. Data in Group b is significantly higher than that in Group a but significantly lower than that in Group c, d, and e. Data in Group c is significantly higher than that in Groups a, and b but significantly lower than that in Groups d and e. Data in Group d is significantly higher than that in Groups a, b, and c but significantly lower than that in Group e. The data that were categorized into 2 groups or 3 groups are not significantly different from the data in those 2 or 3 groups.

Example 1—Base Solvent Modified Guayule Resin/SP Adhesive Vs. Standard SP-Adhesive Step 1—Guayule Base Resin Information Guayule base resins (unmodified) were obtained from Bridgestone Americas of Akron, Ohio. These guayule base resins were previously prepared in a rubber extraction process of guayule with solvents removed after a solvent removal process operating at the temperature of 104.44° C., 115.56° C., 126.67° C., 137.78° C., and 165.56° C., respectively, and may alternatively be referred to as R104, R116, R127, R138, and R166 for simplicity.

Step 2—Soy Protein Isolation

Defatted soy flour with a dispersion index of 90 (obtained from Cargill of Cedar Rapids, IA) was dissolved in water at a ratio of 1:15 (w/w). The pH of the soy protein solution was adjusted to 8.5 with 10 M NaOH to solubilize the soy protein (SP) in the soy protein solution. The pH was kept at 8.5 constantly for 2 hours. The solution was then centrifuged, with the supernatant solution containing the soy protein and water separated from the precipitants such as fiber. The pH of the separated supernatant solution was then adjusted to pH 4.2 with 10 M HCl for two hours to precipitate the soy protein, at which time an additional centrifugation step was performed. The supernatant was then separated from the precipitated soy protein and discarded, with the remaining precipitated soy protein washed and then resolubilized in water to form an SP solution. The SP solution was then neutralized to pH 7.0 with 10 M NaOH. The soy protein was then freeze-dried and ground with a cyclone miller (Udy Corp., Fort Collins, CO.) equipped with a 1 millimeter screen. The freeze-dried and ground soy protein powder was stored at 4° C.

Step 3—Preparation of SP Slurry 2 grams of the soy protein powder obtained from Step 2 above was slowly added to 17 grams of water to form a phase-modified soy protein, which was stirred at 300 rpm for 15 minutes to form a soy protein slurry. The pH of the resultant soy protein slurry was adjusted to 7.0 with 2 M HCl and then stirred at 300 rpm for an additional 2 hours.

Step 4—Base-Solvent Modified Resin Preparation

A solvent mixture was prepared by combining 5 milliliters of hexane, 5 milliliters of acetone, and 3 milliliters of water. One gram of guayule base resin from Step 1 above was added to the solvent mixture and stirred at 400 rpm for 30 minutes to form a resin mixture. Next, 0.5 milliliter of 10 M NaOH was added to the resin mixture and the combination was stirred at 400 rpm for another 18 hours. During this time period, the NaOH and guayule base resin reacted, via a saponification process, to form a modified-guayule resin (i.e., a base-solvent modified guayule resin) contained within the solvent mixture. The process described was repeated for each of the guayule resins from above (i.e., for each of the resins provided after a solvent removal process operating at the temperature of 104.44° C., 115.56° C., 126.67° C., 137.78° C., and 165.56° C., respectively) with the resultant base-solvent modified resins formed respectively from the guayule base resins referred to as BR104, BR116, BR127, BR138, and BR166 for simplicity.

Step 5—Standard SP Adhesive Preparation 19 grams of the SP slurry formed in Step 3 above was mixed with an additional gram of water to form a standard SP adhesive having 10% by weight soy protein.

Step 6—Base-Solvent Modified Guayule Resin-SP Adhesive Preparation 0.15 grams of the bottom phase of the formed modified guayule resin in acetone was extracted from the resin prepared in Step 4. This 1 milliliter mixture, weighing approximately 1 gram, was then pipetted into a container containing 19 grams of the soy protein slurry formed in Step 3 above and mixed to form a base-solvent modified guayule resin-SP adhesive sample having a modified guayule resin concentration of 0.75% (w/w)(i.e., the weight percentage of modified guayule resin in the total weight of the adhesive— 0.15 g/20 g times 100% is 0.75%) and having a soy protein content of 10% by weight of the total weight of the adhesive composition.

Each of the resultant base-solvent modified guayule resin-SP adhesive samples formed from the procedure of Step 6 were labeled SP-BR104, SP-BR116, SP-BR127, SP-BR138, and SP-BR166, respectively. The letter designation SP refers to soy protein and BR refer to base-solvent resin modified, while the number designation such as 104 refers to the original solvent removal temperatures of the guayule base resins provided by Bridgestone Americas from Step 1 above.

Step 7—Base-Solvent Adhesive Evaluation

The base-solvent modified guayule resin-SP adhesives (i.e., SP-BR104, SP-BR116, SP-BR127, SP-BR138, and SP-BR166, respectively) formed in Step 6 above, and the SP adhesive formed in Step 5 above, were each then evaluated for wet and dry-shear strength under the ASTM standard method (ASTM D1183-03) (ASTM, 2003) according to the following procedure:

First, 0.6 milliliters of one of the respective adhesives was spread on glue-free areas of one side of each of a pair of cherry wood veneer panels (2 by 12 centimeters (width by length) supplied by Veneer One (Oceanside, NY)). After 15 minutes, the two panels were assembled with the adhesive-containing sides positioned adjacent to one another. The panels were then hot-pressed for 10 minutes under 2 mega-Pascals (MPa) pressure at 150° C. using a hot press device (Model 3890; Auto 'M', Carver Inc., Wabash, IN). The wood panels were then cooled to room temperature and conditioned in a chamber at 23° C. and 50% relative humidity (RH) for 3 days. The wood panels were then cut into specimens 2 centimeters in length and continued with the conditioning process in the chamber. The process was repeated to form additional specimens for each of the base-solvent modified guayule resin-SP adhesives and the standard SP adhesive.

For the dry tensile strength test, the specimens were removed from the chamber after 4 days. The dry tensile strength test for each of the specimens was performed under the ASTM standard method (ASTM D1183-03) (ASTM, 2003) using an Instron testing machine (Model 4465; Canton, MA) with a crosshead speed of 1.6 millimeters per minute. Four replications of each of the resin-SP adhesives (i.e., BR104, BR116, BR127, BR138, and BR166, respectively) and the standard SP adhesive of Step 5 were evaluated using this procedure, with the mean values of the results provided in FIG. 2.

For the wet tensile strength test, the specimens were conditioned for 2 days and submerged in water for 48 hours. The dry tensile strength test for each of the specimens was performed under the ASTM standard method (ASTM D1183-03) (ASTM, 2003) using an Instron testing machine (Model 4465; Canton, MA) with a crosshead speed of 1.6 millimeters per minute. Six replications of each of the resin-SP adhesives (i.e., SP-BR104, SP-BR116, SP-BR127, SP-BR138, and SP-BR166, respectively) and the standard SP adhesive of Step 5 were evaluated using this procedure, with the mean values of the results also provided in FIG. 2.

As FIG. 2 illustrates, the addition of the base-solvent modified guayule resin provided similar, and in certain cases slightly higher, dry adhesion shear strength as compared with the standard SP adhesive. Further, a significant increase in wet adhesion shear strength was detected in the base-solvent modified guayule resin-SP adhesives relative to the SP adhesive. In particular, the SP-BR104, SP-BR127, and SP-B R116 base-solvent modified guayule resin-SP adhesives provided a 55-60% improvement in wet adhesion shear strength as compared with the standard SP adhesive.

Example 2—H$_2$O$_2$ Modified Guayule Resin/SP Adhesive Evaluation Vs. Standard SP-Adhesive Step 1—H$_2$O$_2$ Modified Guayule Resin Preparation and Subsequent H$_2$O$_2$ Modified Guayule Resin/SP Adhesive Preparation Approximately 5 grams of the guayule base resin as provided in Step 1 of Example 1 above was dissolved in 50 milliliters of acetone to form a solution mixture. 3 milliliters of 50% $H_2O_2$ by volume in water was added to the solution mixture and stirred overnight at 400 rpm to form an $H_2O_2$-modified guayule resin mixture. Approximately 2 milliliters of the $H_2O_2$-modified guayule resin mixture were then blended with the soy protein slurry provided in Step 3 of Example 1 above having 2 grams of soy protein powder. Water was added to adjust the total soy protein concentration in the resultant $H_2O_2$-modified guayule resin-SP adhesive to 10% by weight soy protein.

The same process was repeated for each of the different guayule base resins (i.e., each of the guayule base resins provided from Bridgestone Americas after a solvent removal process operating at the temperature of 104.44° C. and 165.56° C., respectively) to form additional $H_2O_2$-modified guayule resin-SP adhesives by the same process described above, with the resultant $H_2O_2$-modified guayule resin-SP adhesives labeled SP-HR104 and SP-HR166, respectively. The letter designation SP refers to soy protein and HR refer to $H_2O_2$-modified guayule resin, while the number designation such as 104 in SP-HR104 refers to the original solvent removal temperatures of the guayule base resins provided by Bridgestone Americas.

Step 2—$H_2O_2$ Modified Guayule Resin-SP Adhesive Evaluation

The $H_2O_2$-modified guayule resin-SP adhesives (i.e., SP-HR104 and SP-HR166, respectively) formed as described above and a standard SP adhesive formed as in Step 5 of Example 1 above were then evaluated for wet and dry-shear strength under the ASTM standard method (ASTM D1183-03) (ASTM, 2003) according to the procedure as described in Step 6 of Example 1 above, with the mean values of the results also provided in FIG. 3.

As FIG. 3 illustrates, the addition of the $H_2O_2$-modified guayule resin-SP adhesives provided similar, and in certain cases slightly higher, dry adhesion shear strength as compared with the standard SP adhesive. Further, a significant increase in wet adhesion shear strength was detected in the $H_2O_2$-modified guayule resin-SP adhesives relative to the SP adhesive.

Example 3—Rheological Properties, Viscoelastic Properties, and Viscosity Profiles of Modified Guayule Resin/SP Adhesive Evaluation Vs. Standard SP-Adhesive Rheological Properties The rheological properties of the SP and SP-modified guayule resin adhesives of Example 1 above were measured by the Bohlin CVOR 150 rheometer (Malvern Instruments, Southborough, MA, USA). The gap between a plate and a 20 mm-diameter parallel plate head was set to 500 μm. The apparent viscosity was measured at a constant shear rate, 25 $s^{-1}$, and the shear rate range of 0.1-100 $s^{-1}$ at 25° C. The elastic (storage) modulus (G') was measured at the angular frequency of 0.01-1 Hz with dynamic oscillation shear measurement. Water evaporation was prevented by applying silicone oil around the samples.

Viscoelastic Properties

Viscoelastic properties of the SP and SP-modified guayule resin adhesives reflect the intermolecular interactions and mechanical properties of polymers. Elastic modulus or storage modulus (G') indicates stiffness and compactness of polymeric structures (Pradyawong et al., 2019). The elastic modulus of all SP and SP-modified guayule resin adhesives increased with higher oscillation frequency. According to FIG. 4, the SP adhesive provided the lowest elastic modulus response through the entire frequency range. The various SP-modified guayule resin adhesives showed higher elastic modulus indicating a stronger network. SP-BR166 also showed the same rising trend at low-frequency range but started to drop after 0.5 Hz.

Viscosity Profiles

The viscosity of the SP and SP-modified guayule resin adhesives was high in the region of low shear rate. The viscosities decreased with an increase in shear rate indicating non-Newtonian fluid behavior. According to FIG. 5, shear-thinning behavior was observed in all adhesives. SP showed significantly lower viscosity (see Table 1 below). The viscosity of adhesives was increasing with the addition of resins. SP-BR127 presented the highest viscosity following by SP-BR138. The lowest viscosity was found in SP-BR104, SP-BR116, and SP-BR166.

TABLE 1

| Samples | Viscosity Pa · s |
|---|---|
| SP | 1.01 ± 0.08[a] |
| SP-BR104 | 2.43 ± 0.06[b] |
| SP-BR116 | 2.54 ± 0.17[b] |
| SP-BR127 | 4.00 ± 0.45[d] |
| SP-BR138 | 3.06 ± 0.22[c] |
| SP-BR166 | 2.71 ± 0.17[b] |

Example 4—Denaturing Properties of Modified Guayule Resin/SP Adhesive Evaluation Vs. Standard SP-Adhesive Differential Scanning Calorimetry A differential scanning calorimeter (DSC) (Q200, TA instrument, Schaumburg, IL, USA) was used to determine the denaturing behavior of certain SP and SP-modified guayule resin adhesives of Example 1 above. Approximately 20 milligrams of the SP and SP-modified guayule resin adhesives were placed in a $T_{zero}$ aluminum hermetic pan. The samples were initially set at 25° C. for 1 minute and then heated to 120° C. at a heating rate of 10° C./minute. Universal Analysis 2000 software was used to analyze the peak temperatures and denaturation enthalpies.

The denaturing behavior for each of the SP and SP-modified guayule resin adhesives are summarized in Table 2 below:

TABLE 2

| Sample | 2S ($T_d$) (° C.) | 7S ($T_d$) (° C.) | 11S ($T_d$) (° C.) | Total Heat flow (J/g protein) |
|---|---|---|---|---|
| SP | 55.99 ± 0.09[a] | 72.10 ± 0.07[d] | 87.97 ± 0.08[a] | 4.79 ± 0.03[b] |
| SP-BR104 | 56.62 ± 0.32[a] | 73.8 ± 0.06[cd] | 91.54 ± 0.11[b] | 4.30 ± 0.01[c] |

TABLE 2-continued

| Sample | 2S ($T_d$) (° C.) | 7S ($T_d$) (° C.) | 11S ($T_d$) (° C.) | Total Heat flow (J/g protein) |
|---|---|---|---|---|
| SP-BR116 | $56.30 \pm 0.05^a$ | $78.9 \pm 0.75^a$ | $92.26 \pm 0.04^b$ | $4.71 \pm 0.07^b$ |
| SP-BR127 | $56.11 \pm 0.06^a$ | $75.5 \pm 0.45^b$ | $91.53 \pm 0.24^b$ | $4.17 \pm 0.00^c$ |
| SP-BR138 | $55.99 \pm 0.06^a$ | $77.0 \pm 0.32^{ab}$ | $92.02 \pm 0.25^b$ | $4.88 \pm 0.00^b$ |
| SP-BR166 | $56.23 \pm 0.16^a$ | $74.95 \pm 0.13^c$ | $91.90 \pm 0.39^b$ | $5.83 \pm 0.08^a$ |

The DSC thermogram summarized in Table 2 displayed denaturing the behavior of protein subunits. Three major peaks were observed. The denaturation temperature ($T_d$) of SP subunits and heat flow/g protein ($\Delta H_d$) are shown in Table 2. The $T_d$ of 2S, 7S, and 11S protein subunits took place at the temperature range of approximately 55-57° C., 72-79° C., and 87-93° C., respectively.

Compared to SP adhesives, the most noticeable change was discovered in the 7S subunits. A near 7° C. escalation in 7S $T_d$ was found in SP-BR116 SP-modified guayule resin adhesive. A significant increase in 7S $T_d$ was also found in other the SP-modified guayule resin adhesives. SP-BR104 was the only modified guayule resin-SP sample that had no significant change in 7S $T_d$ relative to the SP adhesive. On the other hand, the $T_d$ of the 11S subunit of all the SP-modified guayule resin adhesives was significantly higher than SP adhesive and no differences were observed among the SP-modified guayule resin adhesives. No differences were found in the $T_d$ of the 2S subunit at a significance level of 0.05.

In comparison with SP adhesives, the energy requirement ($\Delta H_d$) to denature SP or resin-SP complexes was not significantly different in the SP-BR116 and SP-BR138 SP-modified guayule resin adhesives. The endothermic absorption was found to be significantly lower in the SP-BR104 and SP-BR127 SP-modified guayule resin adhesives, but higher in the SP-BR166 SP-modified guayule resin adhesives.

An addition of resin enhanced denaturing temperature of the SP-modified guayule resin adhesives. The interactions between the resin and SP network possibly took place at 7S and 11S subunits leading to an improvement in the thermal resistance of the SP-modified guayule resin adhesives.

Rheological Properties

The viscosity and elastic (storage) modulus of SP and resin-SP slurries were measured by the Bohlin CVOR 150 rheometer (Malvern Instruments, Southborough, MA, USA). The gap between a base and a 20 mm-diameter parallel plate head was set to 500 µm. The viscous modulus (G') was measured with dynamic oscillation shear measurement at the angular frequency range of 0.01-0.2 Hz. The apparent viscosity curves were recorded as the function of the shear rate from 0.15 s$^{-1}$ to 5 s$^{-1}$. Silicone oil was applied around the samples to prevent water evaporation during the test.

Viscoelastic properties were measured to study the intermolecular interactions and mechanical properties of the resins. Elastic modulus or storage modulus (G') indicates stiffness and compactness of polymer structures. According to FIG. 6, the elastic modulus of all resins increased with higher oscillation frequency. The stiffness of all samples increased as a response to an elevated level of frequency. SP with 7.5% resin mixture showed the highest elastic (storage) modulus and thus the highest intermolecular protein interaction, suggesting that a high level of compactness was observed. However, the further addition of resin resulted in weaker intermolecular interactions between SP and resin.

Non-Newtonian fluid behavior was observed in all SP and resin-SP adhesives. The viscosity decreased with increasing shear rate as seen in FIG. 7. The viscosity of resin-SP mixtures was higher than the SP slurry. The highest viscosity was observed in 7.5% resin. The viscosity slightly dropped with the addition of resin more than 7.5%. Similar viscosity profiles were observed in mixtures with 15-30% resin concentrations.

Contact Angle Measurement

The contact angles of SP, and SP blending with 7.5 and 22.5 percent were observed by the Drop Shape Analyzer (KRÜSS Scientific Instruments, Inc., Matthews, NC). The slurries were auto dropped under the rate of 6.67 µL/s through 2 mm syringe tip. The droplet size was set to 5 µL. The average of left and right droplet angles was recorded till they were stable. The average 10 replications for each sample were reported.

The angle of the adhesive drop on a solid surface implied the spreadability of adhesives on wood surfaces. The sample with low surface tension indicated a good spreadability on a solid surface reflexing on low contact angle degree. According to Table 3 below, resin increased surface tension of SP adhesive since resin-SP blends showed significantly higher contact angle compared to the pure SP sample (i.e., 0% resin as shown below). The contact angle of the SP increased from 61.39±2.80° to 85.06±2.37° by blending with 7.5% of resin. The contact angle of SP-resin blends still significantly higher than that of the pure SP sample but it decreased to 73.52±1.84° with triple the amount of resin (22.5%). The interactions between SP and resin at low resin content highly effected the surface tension of adhesive. The interactions between SP and resin may partially be different in the sample with high resin content leading to lower surface tension. More details will be explained in the following sections.

TABLE 3

| % Resin | Contact angle (°) |
|---|---|
| 0 | $61.39 \pm 2.80^a$ |
| 7.5 | $85.06 \pm 2.37^b$ |
| 22.5 | $73.52 \pm 1.84^c$ |

Denaturing Behavior

The denaturing behavior of soy-protein subunits in the adhesives was observed using a differential scanning calorimeter (DSC) (Q200, TA instrument, Schaumburg, IL, USA). Approximately 20 mg of adhesives were filled in a $T_{zero}$ aluminum hermetic pan. The samples were set at 25° C. for 1 minute and then heated at a heating rate of 10° C./min. to 120° C. The peak temperatures and denaturation enthalpies were analyzed using Universal Analysis.

The mean values of the denaturation temperature ($T_d$) of 7S, and 11S, and heat flow/g protein ($\Delta H_d$), are shown in Table 4. The DSC endothermic thermograms of the samples displayed 2 major peaks at temperature ranges of 71-75 and 87-93° C., which are assigned to the denaturation behaviors of 7S, and 11S protein subunits, respectively. The denaturation temperature $(T_d)$ of 7S and 11S subunits significantly increased with an addition of resin and slightly decreased with further addition of resin. On one hand, the $T_d$ of 7S subunit of 7.5% and 15% additional resin is significantly higher than the $T_d$ of SP adhesive. On the other hand, the $T_d$ of 11S subunit of all resin-SP adhesives is significantly higher than SP adhesive. The highest $T_d$ was observed in the range of 7.5% to 22.5% addition of resin for both subunits. The energy requirement to denature the protein structure was gradually increasing with an elevated level of resin content. Approximately 65% more energy is needed to denature 30% resin-SP adhesive than non-resin adhesive. The higher $T_d$ and $\Delta H_d$ indicated that resin strengthened the SP structure and improved the thermal resistance of SP adhesive. The interactions between resin and SP formed strong resin-SP networks.

TABLE 4

| Resin Con. (%) | 7S ($T_d$) (° C.) | 11S ($T_d$) (° C.) | Total Heat flow (J/g protein) |
|---|---|---|---|
| 0.00 | 72.10 ± 0.07$^{ac}$ | 87.97 ± 0.08$^d$ | 4.79 ± 0.03$^a$ |
| 3.73 | 73.8 ± 0.01$^{ab}$ | 90.60 ± 0.06$^{ac}$ | 5.03 ± 0.05$^a$ |
| 7.50 | 74.95 ± 0.13$^b$ | 91.90 ± 0.39$^{ab}$ | 5.83 ± 0.08$^b$ |
| 15.00 | 74.44 ± 0.41$^b$ | 92.06 ± 0.38$^b$ | 6.98 ± 0.07$^c$ |
| 22.50 | 73.65 ± 0.01$^{abc}$ | 91.55 ± 0.20$^{ab}$ | 7.32 ± 0.02$^c$ |
| 30.00 | 71.80 ± 0.74$^c$ | 89.48 ± 0.20$^c$ | 7.93 ± 0.13$^d$ |

FTIR Fourier Transform Infrared Spectrometry

Infrared spectra of the adhesives were collected by Nicolet™ iS™10 FTIR Spectrometer (Thermo Scientific, Waltham, MA, USA). Approximately 20 milligrams of dried adhesive samples were scanned 32 times with the spectral range from 4000 to 650 cm$^{-1}$. The spectral resolution was set to 4 cm$^{-1}$.

The differences of SP and resin-SP FTIR spectra before and after an addition of resin were observed through the IR absorption profile. The most prominent absorption peaks of protein backbone are amide I and II bands. According to FIG. 8, Amide I peak of SP was found at 1628 cm$^{-1}$ which mainly correlated to the stretching and vibration of C=O bond in peptide linkage. Another absorption peak, Amide II, was found at 1531 cm$^{-1}$ corresponding to the C—N stretching and N—H bending of protein backbone. No differences were found with an addition of 7.5% resin. The overall changes in spectra profile became more obvious with an elevated resin content indicating that more SP-resin interactions occurred with more resin. Comparing to SP, the changes in the absorption profile were observed in high levels addition of resin (15% and 30%). Slight shifting of Amide I peak from 1628 cm$^{-1}$ in SP to 1633 cm$^{-1}$ in SP blending occurred with further addition of resin. Moreover, the obvious changes were observed in Amide II peak. The peak gradually shifted with the elevated level of resin content (see FIG. 8). The Amide II peak of SP and SP blending with 7.5% resin showed at 1531 cm$^{-1}$. With 15% resin content, the peak became broader and flatter in the range of 1515 cm$^{-1}$ to 1531 cm$^{-1}$. Then the peak shifted to 1515 cm$^{-1}$ in the highest resin content (30%) spectrum. The changes at Amide I and Amide II peaks indicated interactions between resin and SP around C=O, C—N and N—H region of protein backbone which caused changes to the protein secondary structural components and conformations.

The changed pattern around 1072 cm$^{-1}$ area were also more obvious at high resin blended conditions. The peak slowly disappeared at elevated level of resin content. The weaker signal around the area possibly reflected the changes around C—O and/or C—NH$_2$ side chain regions. Therefore, the changes in a spectral profile after an addition of resin indicated resin-SP interactions in protein backbone and sidechain regions, which cause the changes in protein secondary structures and conformations.

Sodium Dodecyl Sulfate Polyacrylamide Gel Electrophoresis (SDS-PAGE)

SP and SP-modified resin slurries were prepared at the SP concentration of 20 mg/ml. The molecular weight distribution of SP and SP-modified resin samples were studied by the sodium dodecyl sulfate-polyacrylamide electrophoresis (SDS-PAGE) technique under non-reducing conditions. The samples were mixed with a buffer containing 2% of SDS, 25% of glycerol, and 0.01% of bromophenol blue and loaded on 12% separation gel and 4% stacking gel with a discontinuous buffer system. The gel Electrophoresis was performed with the molecular weight standard (10-250 kDa) (Precision Plus Protein™ Standards, Dual color, BIORAD, CA, USA) at 40 mA and 150 V for 120 min. The gel was stained by 0.25% Coomassie brilliant blue R-250 and destained by 10% of acetic acid and 40% of methanol solution mixture.

The molecular weight distribution profile of SP and resin-SP samples was showed in FIG. 9. All of the samples contained general soy protein general subunits bands. The new high molecular weight (MW) band (>250 kDa) was observed in SP blending with resin at 3.75%, 7.50% and 15% (see the arrows in FIG. 9) indicating a formation of resin-SP high MW complex. This new high MW band was not found in SP or SP blended with high resin concentration (22.5% and 30%). The interactions with excess amount of resin may led to a larger resin-SP complex and mainly trapped in the loading wells. The band intensity ratios of the resin-SP aggregate in the loading well of SP blending with 3.75%, 7.50%, 15.00%, 22.50%, and 30.00% resin were 1.0:1.0:1.1:1.3:1.4 whereas, the new high MW band intensity ratios of SP blending with resin were 4.8:4.0:1.0:0.0:0.0, respectively. The new high MW band intensity of SP-15% resin blend sharply dropped to 1.0 while the resin-SP aggregate band intensity started to raise. In addition, the absent of new high MW band occurred while the band intensity ratio of resin-SP aggregate elevated in SP blended with high resin contents of 22.5% and 30%. Therefore, resin interacted with protein and formed high MW fraction at low resin concentration. With extra amount of resin, more interactions between resin and protein occurred and resulted in more portion of large resin-SP aggregate. This scenario could affect the changes in physiochemical properties of the adhesives such as rheological behavior and surface tension property. A formation of the high MW complex and the large resin-SP aggregate may affect the overall adhesion performance of resin-SP samples.

Adhesion Property

According to FIG. 10, which plots the mean values of wet and dry strength of resin-SP adhesives at 165.56 degrees Celsius, an addition of resin at low levels (3.73%-15%) did not give any negative effects on dry adhesion strength as no significant differences was found among the standard SP adhesive and SP adhesive blended with the resin ranging from 3.73% to 15%. Negative impacts on dry adhesion strength were found with samples containing high amount of resin mixture, 22.5%, and 30%. On the other hand, the increase in the wet adhesion strength were observed in the adhesive with 3.75%, 7.5%, and 15% addition of resin, respectively, indicating resin improved water resistance of SP adhesive. However, the wet adhesion strength significantly decreased with further addition of resin. No differences in wet adhesion strength were found between pure SP and SP-resin blends with high resin contents of 22.5% and 30%.

Resin-SP blends were more uniform with high resin content encouraging more resin-SP interactions. Comparing to the samples with lower resin content (3.73%-15.00%), more portion of SP active groups in the high resin mixed samples (22.50%-30.00%) interacted with resin leading to excessive interactions between the resin and SP and leaving less SP active groups available to adhere to the wood surface which resulted in a weaker adhesion strength. Additionally, the excess interactions resulted in more large resin-SP aggregate. Even though excess resin-SP interactions gave positive impacts on rheological behavior and surface tension property of the SP blending with high resin contents, the large resin-SP aggregate might have less flexibility to flow into wood grain and wood surface cells or capillary path The large resin-SP aggregate might also obstruct a smaller SP/resin-SP fractions to get into wood surface cells or capillary path which directly reduced the interactive surface and decreased the binding area between the adhesive and wood specimen. Therefore, an extra amount of resin and excess resin-SP interactions gave more negative impacts to the overall adhesion performance.

Summary of Results

The interactions between resin and SP strengthened SP networks resulting in changes in rheological properties, increases in thermal properties, and improvement in water resistance of SP adhesive. The SP-resin interactions increased with an elevated level of resin content resulting in a strong SP-resin networks which consuming more energy to denature. The studies of rheological, thermal, and adhesion properties indicated that blending resin in the range of 7.5% to 15% enhanced those properties. The water resistance of SP adhesive improved by 70.5% with 7.5% addition of resin. An excessive addition of resin lead to the inferior overall adhesion strength. These finding enlightened the way to apply guayule resin as a water resistance enhancer for bio-based adhesives and utilized it as a value-added product.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An adhesive composition for coupling together substrates, said adhesive composition comprising:
   a base-solvent modified guayule resin;
   a soy protein mixed with said base-solvent modified guayule resin; and
   an unmodified guayule base resin, said unmodified base resin obtained in a rubber extraction process of guayule at solvent removal temperatures ranging from 104 to 166 degrees Celsius,
   wherein said base-solvent modified guayule resin is formed by:
      forming a resin mixture by mixing an unmodified guayule base resin with a solvent mixture, said solvent mixture comprising acetone;
      mixing a base with the resin mixture, reacting said base with said unmodified guayule base resin via a saponification process within said resin mixture, and
      extracting a bottom phase of said base-solvent modified guayule resin in acetone, and
   wherein said unmodified guayule base resin is included in the adhesive composition in an amount ranging from 0.1% to 50% by weight of the total weight of said soy protein.

2. The adhesive composition of claim 1, wherein said soy protein comprises from 5% to 40% by weight of the total weight of the adhesive composition.

3. The adhesive composition of claim 1, wherein said modified guayule resin comprises from 0.1% to 50% of the total weight of soy protein in the adhesive composition.

4. The adhesive composition of claim 1, wherein said modified guayule base resin is formed from an unmodified guayule base resin, said unmodified base resin obtained in a rubber extraction process of guayule at solvent removal temperatures ranging from 104 to 166 degrees Celsius.

5. A wooden structure comprising;
   a first wooden substrate;
   a second wooden substrate; and
   said adhesive composition according to claim 1 applied between said first and said second wooden substrate for adhering said first wooden substrate to said second wooden substrate.

6. A method for forming an adhesive composition, comprising:
   forming a base-solvent modified guayule resin from an unmodified guayule base resin, with the unmodified base resin obtained in a rubber extraction process of guayule at solvent removal temperatures ranging from 104 to 166 degrees Celsius;
   mixing soy protein with said base-solvent modified guayule resin; and
   mixing an unmodified guayule base resin with the soy protein and the base-solvent modified guayule resin,
   wherein the unmodified guayule base resin is included in the adhesive composition in an amount ranging from 0.1% to 50% by weight of the total weight of the soy protein, and wherein said base-solvent modified guayule resin is formed by:
   forming a resin mixture by mixing the unmodified guayule base resin with a solvent mixture, the solvent mixture comprising acetone;
   mixing a base with the resin mixture;
   reacting the base with the guayule base resin within the resin mixture via a saponification process in the resin mixture, and
   extracting a bottom phase of the base-solvent modified guayule resin in acetone.

7. The method of claim 6, wherein said soy protein comprises from 5% to 40% by weight of the adhesive composition.

8. The method of claim 6, wherein the base-solvent modified guayule resin comprises from 0.1% to 50% of the total weight of soy protein in the adhesive composition.

9. The method of claim 6, wherein the base is NaOH.

10. The method of claim 6, further comprising a step of forming a soy protein slurry comprising a soy protein; and
   wherein said step of mixing soy protein with the base-solvent modified guayule resin comprises mixing the base-solvent modified guayule resin with the soy protein slurry.

11. The method of claim 10, wherein said step of forming a soy protein slurry comprises:

forming a phase-modified resin by mixing a soy protein with water; and introducing an acid to the phase-modified resin to adjust the pH to a neutral pH.

12. A wood adhesive composition formed according to the method of claim 6.

\* \* \* \* \*